Jan. 30, 1923.

R. F. RUNGE.
CHUCK.
FILED JULY 22, 1921.

1,443,651

Inventor
Robert F. Runge
By his Attorneys
Rogers, Kennedy Campbell

Patented Jan. 30, 1923.

1,443,651

UNITED STATES PATENT OFFICE.

ROBERT F. RUNGE, OF PHILADELPHIA, PENNSYLVANIA, ASSIGNOR TO THE HESS-BRIGHT MANUFACTURING COMPANY, A CORPORATION OF DELAWARE.

CHUCK.

Application filed July 22, 1921. Serial No. 486,667.

*To all whom it may concern:*

Be it known that I, ROBERT F. RUNGE, a citizen of the United States, residing at Philadelphia, in the county of Philadelphia and State of Pennsylvania, have invented certain new and useful Improvements in Chucks, of which the following is a specification, reference being had therein to the accompanying drawing.

This invention relates to chucks, one of the objects being to provide a chuck wherein the work may be held with a comparatively light pressure to admit of its being centered, and thereafter held with a stronger pressure to admit of operations thereon. Another object of the invention is to provide a chuck wherein the work will be so held that access may be had both to the interior and exterior of the same for operations thereon. With these and other objects in view my invention consists in the improved features of construction and arrangement of the parts which will be fully set forth in the description to follow, and the novel parts thereof designated in the appended claims.

Figure 1:
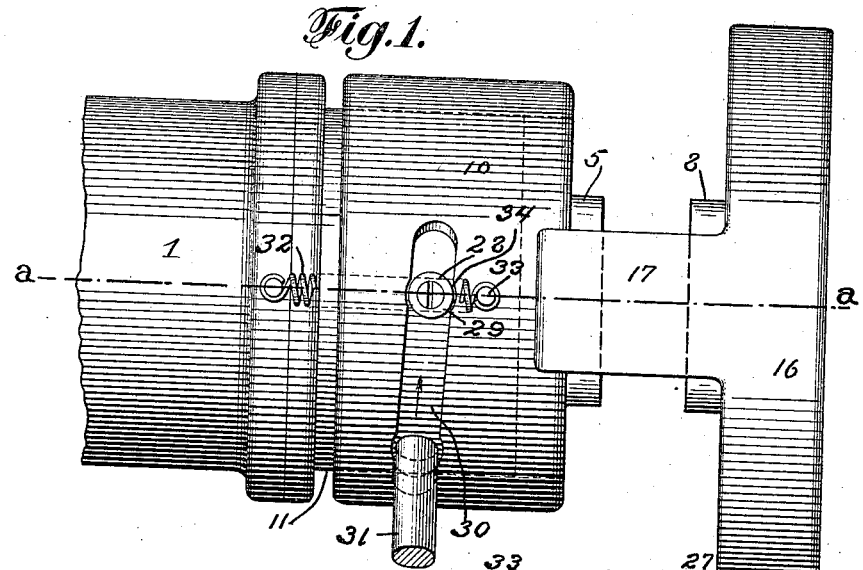
Fig. 1 is a top plan view of a chuck having my invention embodied therein.

Referring to the drawings:

My improved chuck is designed particularly for holding work pieces of annular or ring-like form such for instance as the inner and outer rings of anti-friction bearings, and the form and construction of the chuck is such that while the ring will be held so that the operating tool or tools may act on both the interior and exterior of the ring, the latter may be rapidly rotated. The preferred construction for accomplishing this result and which construction is shown by way of example in the accompanying drawing, comprises a fixed support or frame 1 having a horizontal bearing opening therein in which is mounted a spindle 2 adapted to be rotated by any suitable means. The spindle has threaded on it a collar 3 which abuts at its rear end against an annular shoulder 4 on the spindle and which at its front end has screwed therein and fastened fixedly thereto, an annular extension 5 of the collar which extension constitutes a seat for the work piece A to be operated on, and is rotatable with the spindle. A fixed cylindrical casing 6 extends horizontally from the frame 1 and surrounds and is spaced from the collar 3 and is provided on its end with an annular outwardly projecting shoulder $6^a$ the purpose of which will presently appear. 7 designates the clamping jaw of the chuck, consisting of a jaw proper 8 adapted to engage the work and hold it against the work seat, and a body or frame portion 9 which carries the jaw proper and which is so sustained by the cylindrical casing 6, that it may be moved in the direction of the axis of rotation of the spindle so as to carry the jaw proper to and from the work seat. The body portion 9 of the jaw is formed with a neck 10 which surrounds and is spaced from the cylindrical casing 6, and receives support at its forward end from the shoulder $6^a$ around which it slidingly fits. Rearward of the shoulder the neck receives support from a sleeve 11 loosely surrounding and supported by the fixed casing 6 and located within the neck and movable circumferentially thereof. This sleeve constitutes the actuating member for the clamping jaw and is so operatively connected with the neck portion of the jaw, as will later be described in detail, that when moved circumferentially, the jaw will be caused to move to and from the work seat.

The frame or body portion of the clamping jaw thus mounted, while capable of a movement axially of the chuck so as to cause the jaw proper to move to and from the work seat, is held from circumferential movement. This is effected in the present instance by means of a finger 12 projecting radially from the body portion of the clamping jaw and extending loosely into a slot 13 extending through a horizontal arm 14 extending forwardly from the frame 1.

Figure 2:
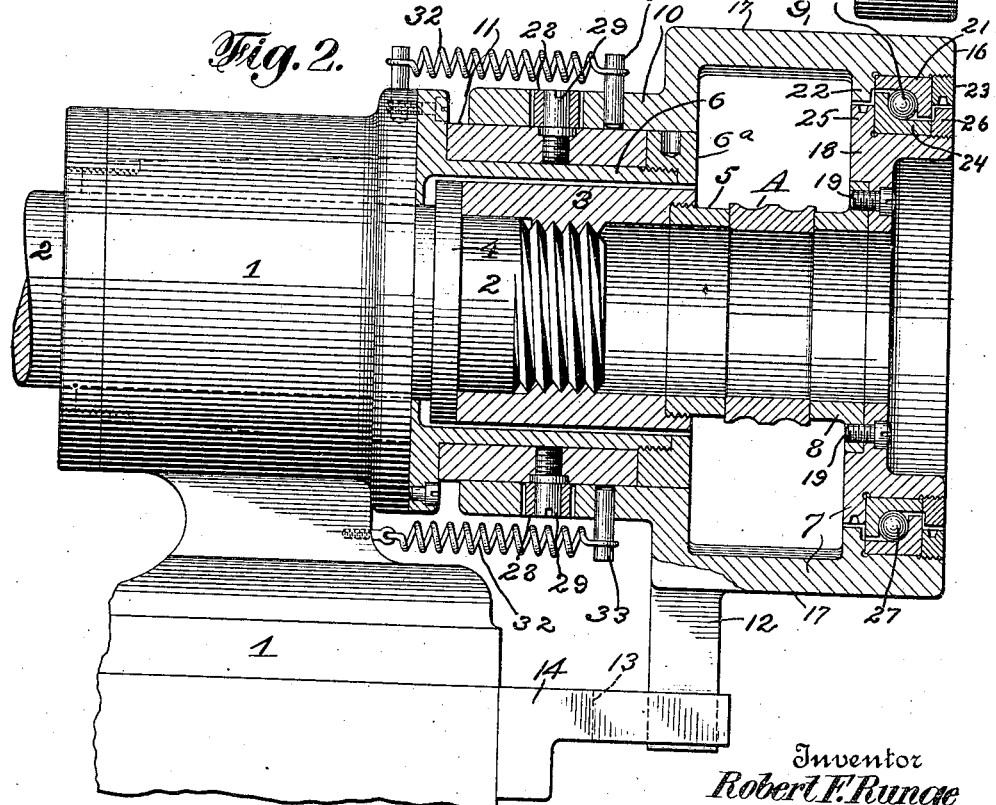
Fig. 2 is a sectional elevation of the same on the line $a$—$a$ of Fig. 1, showing a work piece held by the chuck.

The jaw proper 8 is in the form of a ring facing the work seat 5 and is loosely mounted within an annular frame 16 fixed to the ends of two parallel arms 17 extending forwardly at diametrically opposite points from the neck 10, whereby the jaw proper is movable circumferentially relatively to the body portion of the jaw in order that it will rotate with the work when engaged therewith in clamping the same on the work seat. The jaw proper 8 is preferably detachably connected with a ring 18 by means of screws 19, and between the ring 18 and annular frame 16, a combined radial and thrust bearing is applied in order to relieve the friction between the jaw proper and the relatively fixed annular frame. This bearing may be of any appropriate form and construction which will answer the objects in view, but I prefer to adopt the form shown in Fig. 2 wherein it will be seen that a casing ring 21 is clamped against a shoulder 22 on the annular frame by means of a nut 23 screwed in said frame, and a second casing ring 24 is clamped against a shoulder 25 on the ring 18 by means of a nut 26 screwed into the ring 18. These casing rings are formed with axial and radial portions which respectively face each other and constitute opposing raceways between which a series of rolling elements in the form of bearing balls 27 are located, thus giving axial and radial support to the jaw proper while permitting the same to move circumferentially relatively to the body portion of the jaw with a minimum of friction. The nut 26 extends radially beyond the radial portion of the casing ring 21 so as to overlap the same, the result being that when the body of the clamping jaw is moved in a direction to release the work, the radial portion of the ring 21 engaging the overlapping portion of the nut 26, will carry the jaw proper with it and away from the work seat; and when the body of the jaw is moved in the opposite direction to clamp the work, the radial portion of the casing ring 21 will engage the balls and cause them in turn to engage the radial portion of casing ring 24, thus carrying the jaw proper towards the work seat.

The movement of the clamping jaw to and from the work seat by the jaw actuating member or sleeve 11 is effected through the medium of two lugs in the form of rollers 28 mounted on pins 29 projecting from the sleeve at diametrically opposite points and engaging respectively in cam slots 30 formed in the neck 10 of the body portion of the jaw at opposite sides. These cam slots extend at an angle relative to the path of circumferential movement of the rollers, and are arranged at opposite angles to each other, the arrangement being such that when the sleeve is turned circumferentially in the direction of the arrow in Fig. 1, which may be conveniently effected by a handle 31 connected with the sleeve and extending outwardly through one of the slots, the rollers engaging the rear cam walls of the slots will positively shift the body of the jaw inwardly towards the work seat, which will cause the jaw proper to engage and clamp the work piece; and when the sleeve is shifted circumferentially in the opposite direction, the rollers engaging the opposite cam walls of the slots, will cause the jaw to be positively moved in the opposite direction and release the work piece. I propose however to combine with this positive acting means, additional jaw actuating means which will act preferably with an impositive or yielding pressure, and will function to force the jaw proper against the work piece with a relatively light pressure before it is positively actuated to more firmly clamp the work. The purpose of this initial relatively light clamping pressure on the work piece is to enable it to be centered on its rotating work seat before beginning the actual operation by the operating tool, such centering being effected by engaging the operating tool with the lightly held rotating work piece and shifting the same on the work seat until there is a continuous contact between the tool and the rotating work piece, such continuous contact indicating that the work piece is in proper centered relation to the axis of rotation of the work seat. In the present instance the impositive acting means is in the form of two tension springs 32, arranged at diametrically opposite points relative to the neck of the jaw, the rear ends of which springs are connected with the fixed framing 1 whence they extend axially and have their forward ends connected with pins 33 projecting outwardly from the neck 10 at points forward of the slots therein. The tendency of the springs is to urge the clamping jaw rearwardly so as to carry the jaw proper towards the work seat, and a play or lost motion of the jaw relative to the rollers is provided by enlarging the cam slots locally as at 34, whereby the springs are enabled to force the jaw against the work piece independently of the positive clamping action brought about by the movement of the rollers in the cam slots as heretofore described.

In the position of the parts shown in Fig. 1, the rollers are seated in the enlarged portions of the slots, and the springs are now free to draw the jaw inwardly and engage the jaw proper against the work with yielding pressure. In this position of the parts the centering operation of the work piece may be effected as described, and when it has been brought to the proper center, the handle 31 is moved upwardly, thereby carrying the rollers against the rear cam walls of the cam slots and causing the jaw to positively and more firmly clamp the work piece for such operations as it may be desired to perform thereon. When the work piece is to be released, the handle is moved in the opposite direction, thereby forcing the rollers against the opposite cam walls of the slots and positively moving the jaw outwardly away from the work seat and stretching the springs and placing them under tension, the rollers in this action passing beyond the enlarged portions of the slots and occupying the positions shown by dotted lines in Fig. 1. With the jaw proper thus separated from the work seat, a new work piece may be set in position, and the handle being moved upwardly as before, the jaw will be moved inwardly until the rollers enter the enlarged portions of the slots, whereupon the springs will become active on the jaw and will hold the work piece against the work seat yieldingly for the centering operation previously described.

Due to the ring-like form of the jaw proper, and to the ring 18 to which it is secured, access may be had to the interior of the work piece through the opening in the center of the ring; and due to the support of the annular frame 16 by the oppositely disposed arms projecting forwardly from the neck 10, access may be had through the lateral openings between said arms and between the end of the neck and said annular frame, to the exterior of the work so that in the case of casing rings for bearings for instance, the grinding wheels or other tools may be presented to the ring concurrently for action on the bore and on the exterior of the same.

It will be observed from the construction described that the movable clamping jaw is mounted directly upon and is supported by the forward end of the frame or support in which the rotary spindle carrying the work seat is mounted, thus bringing the said parts in close proximity to each other and thereby preventing independent vibrations of the same.

In the foregoing description and accompanying drawings I have set forth my invention in the particular detailed form which I prefer to adopt and which in practice has been found to answer to a satisfactory degree the ends to be attained. It will be manifest however that these details may be variously changed and modified without departing from the spirit of the invention; and further it will be understood that the invention is not limited to any particular form or construction of the parts except in so far as such limitations are specified in the claims.

Having thus described my invention, what I claim is:

1. In a chuck, the combination of a work seat, a clamping jaw movable to and from the work seat, a circumferentially movable jaw actuating member adapted to positively move the jaw toward the work seat, said jaw being movable toward the work seat independently of the actuating member, and means acting on the jaw and operating to move the same independently.

2. In a chuck, the combination of a work seat, a clamping jaw movable to and from the work seat, a circumferentially movable jaw actuating member adapted to positively move the jaw toward the work seat, said jaw being movable toward the work seat independently of the actuating member, and a spring acting on the jaw and operating to move the same independently.

3. In a chuck, the combination of a work seat, a clamping jaw movable to and from the work seat, said jaw being provided with a cam surface extending angularly relative to the movement of the jaw, a circumferentially movable jaw actuating member engaging said cam surface to positively move the jaw toward the work seat, said jaw being movable toward the work seat independently of the actuating member, and means acting on the jaw to move the same independently.

4. In a chuck, the combination of a work seat, a clamping jaw movable to and from the work seat, said jaw being provided with a cam surface extending angularly relative to the movement of the jaw, a circumferentially movable jaw actuating member engaging said cam surface to positively move the jaw toward the work seat, said jaw being movable toward the work seat independently of the actuating member, and a spring acting on the jaw to move the same independently.

5. In a chuck, the combination of a work seat, a clamping jaw movable to and from the work seat, and provided with a cam slot extending angularly in relation to the path of movement of the jaw, a circumferentially movable jaw actuating member engaging in said slot to positively move the jaw, said jaw being movable toward the work seat independently of the actuating member, and a spring acting on the jaw to move the same independently.

6. In a chuck, the combination of a work seat, a clamping jaw movable to and from the work seat, said jaw provided with a cam slot extending angularly with reference to the path of movement of the jaw, a jaw actuating member movable circumferentially and provided with a lug fitting between the walls of the slot, said slot being widened locally to permit of a movement of the jaw toward the work seat independently of the lug, and means acting on the jaw and tending to move the same independently.

7. In a chuck, the combination of a fixed support, a work seat, a clamping jaw sustained by the fixed support and movable to and from the work seat, said clamping jaw being provided with a cylindrical neck surrounding the fixed support and said neck being provided with a cam surface extending angularly in relation to the path of movement of the jaw, a jaw actuating member comprising a sleeve surrounding the fixed support and movable circumferentially thereof and a projecting lug engaging the cam surface, whereby the circumferential movement of the actuating member will move the clamping jaw to and from the work seat, said jaw being movable toward the work seat independently of the lug, and a spring acting on the clamping jaw and tending to move the same independently.

8. In a chuck, the combination of a fixed support, a work seat adapted to be rotated relatively to said support, a work clamping jaw comprising a body portion sustained by the fixed support and movable relatively thereto in the direction of the axis of rotation, and a jaw proper sustained by and movable with the body portion, and rotatable relatively there to about said axis of rotation, and an actuating member for said clamping jaw operable to move the same.

9. In a chuck, the combination of a rotatable work seat, a work clamping jaw comprising a non-rotatable body portion movable in the direction of the axis of rotation and a jaw proper movable axially with said body portion and rotatable relatively thereto about said axis of rotation and adapted to engage the work on the seat, and an actuating member for the clamping jaw operable to move the same in the direction of said axis.

10. In a chuck, the combination of a fixed supporting means, a work seat rotatable relatively thereto, a work clamping jaw comprising a body portion sustained by the supporting means and movable relatively thereto in the direction of said axis, said body portion being held against circumferential movement and a jaw proper sustained by and movable with the body portion and movable and rotatable relatively thereto around said axis, and a jaw actuating member engaging the body portion of the jaw to move the same axially.

11. In a chuck, the combination of a fixed supporting means, a work seat rotatable relatively thereto, a work clamping jaw comprising a body portion sustained by the supporting means and movable in the direction of the axis of rotation and a jaw proper rotatable about said axis relatively to the body portion, and antifriction members between the body portion and the jaw proper.

12. In a chuck, the combination of a fixed supporting means, a work seat rotatable relatively thereto, a work clamping jaw comprising a body portion sustained by said supporting means and movable in the direction of the axis of rotation and a jaw proper rotatable about said axis relatively to the body portion, and a combined radial and thrust bearing between said body portion and jaw proper.

13. In a chuck, the combination of a rotatable work seat, a clamping jaw movable to and from the work seat and comprising a non-rotatable portion and a jaw proper rotatable with the work, the said non-rotatable portion being formed with a lateral opening to permit access to the exterior of the work, and an actuating member for moving the clamping jaw to and from the work seat.

14. In a chuck, the combination of a rotatable work seat, a clamping jaw movable to and from the work seat and comprising a non-rotatable portion and a jaw proper rotatable with the work, the said non-rotatable portion being formed with a lateral opening to permit access to the exterior of the work and the jaw proper being provided with an opening to permit access to the interior of the work, and an actuating member for moving the clamping jaw to and from the work seat.

15. In a chuck, the combination of a work seat, a clamping jaw movable to and from the work seat and comprising non-rotatable axially extending arms spaced circumferentially from each other an annular member connected with said arms and spaced longitudinally from the work seat and a clamping jaw proper sustained by the annular member, said clamping jaw proper being provided with an axially extending opening through which access may be gained to the interior of the work, the spaces between said arms permitting access to the exterior of the work, and an actuating member for the clamping jaw operable to move the same to and from the work seat.

16. In a chuck, the combination of a fixed support, a work seat, a work clamping jaw, said jaw comprising a neck surrounding the fixed support and supported thereby, circumferentially spaced arms extending longitudinally from the neck and annular member connected with the arms and an annular clamping jaw proper supported by the annular member, whereby access may be gained to the interior of the work through the annular jaw proper, and whereby access may be gained to the exterior of the work between the longitudinal arms, and a jaw actuating member sustained by the fixed supporting means and operatively engaged with the clamping jaw to operate the same.

17. In a chuck, the combination of a frame, a work seat rotatable relatively thereto, a clamping jaw comprising a body portion sustained by the frame and movable relatively thereto in the direction of the axis of rotation and confined against circumferential movement, and a jaw proper movable with the body portion and rotatable relatively thereto about said axis, said body portion being formed with a lateral opening to permit access to the exterior of the work piece, and said jaw proper being formed with an axially extending opening to permit access to the interior of the work piece.

18. In a chuck, the combination of a fixed supporting frame, a rotary spindle mounted therein and carrying a work seat, a member surrounding the forward portion of said spindle and supported by said frame to move in the direction of the axis of rotation of the spindle, said member carrying a work clamping jaw facing the work seat, and an actuating device for said member sustained by the frame and operable to move the member in the direction of said axis.

19. In a chuck, the combination of a fixed supporting frame, a rotary spindle mounted therein and carrying a work seat, a member surrounding the forward portion of said spindle and supported by said frame to move in the direction of the axis of rotation of the spindle, said member carrying a work clamping jaw facing the work seat, and an actuating device for said member sustained by the frame between the spindle and the surrounding member and operable to move the latter in the direction of said axis.

20. In a chuck, the combination of a fixed supporting frame provided with a forwardly extending cylindrical casing, a spindle rotatably mounted in the supporting frame and extending within said casing, said spindle carrying a work seat rotatable with it, a work clamping jaw comprising a body portion surrounding the casing and supported thereby to move to and fro in the direction of the axis of rotation and confined against circumferential movement, and a jaw proper carried by the body portion to act on the work piece and clamp the same against the work seat, an actuating device for the clamping jaw operable to move the same in the direction of the axis of rotation to and from the work seat, said jaw being movable toward the work seat independently of the actuating device, and an axially extending tension spring connected respectively with said fixed supporting frame and with the jaw and acting to urge said jaw toward the work seat.

21. In a work holding device, the combination with a rotary spindle provided with a work seat, of a fixed casing surrounding the spindle rearwardly of the work seat, a jaw having a work engaging portion capable of rotation with the spindle and disposed forwardly of the work seat and cooperative therewith, said jaw having a body portion surrounding said casing and capable of reciprocation thereon, means for preventing the rotation of the body portion of the jaw with the spindle, means active upon the jaw for yieldingly pressing the work engaging portion against a work piece interposed between the same and the work seat, and means for positively retracting the jaw for clamping the work piece against the seat.

22. In a work holding device, the combination with a rotary spindle, of a casing surrounding the spindle and fast with the bearing supporting the same, a jaw having a body portion surrounding the said casing and capable of reciprocation thereon, said body portion comprising a neck having a pair of diametrically opposed cam slots each having an enlargement, a sleeve mounted upon said fixed casing and capable of rotation thereon, rollers mounted on the sleeve and located in the cam slots, the forward end of the spindle being provided with a work seat, and the body portion of the jaw extending forwardly of said work seat and constituting a housing for a ball bearing, a combined radial and thrust ball bearing located therein and a jaw proper carried by the body portion of the clamping jaw in cooperative relation to the work seat and to the ball bearing, and elastic means for retracting the body portion of the jaw when the cam rollers are positioned in the enlargements of the cam slots.

In testimony whereof, I have affixed my signature hereto.

ROBERT F. RUNGE.